(12) United States Patent
Psenak et al.

(10) Patent No.: US 11,277,264 B2
(45) Date of Patent: *Mar. 15, 2022

(54) APPLYING ATTESTATION TOKENS TO THE INTERMEDIATE SYSTEM TO INTERMEDIATE SYSTEM (ISIS) ROUTING PROTOCOL

(71) Applicant: Cisco Technology, Inc., San Jose, CA (US)

(72) Inventors: Peter Psenak, Bratislava (SK); Paul Wells, Eden Prairie, MN (US); Ketan Jivan Talaulikar, Pune (IN); Clarence Filsfils, Brussels (BE)

(73) Assignee: CISCO TECHNOLOGY, INC., San Jose, CA (US)

(*) Notice: Subject to any disclaimer, the term of this patent is extended or adjusted under 35 U.S.C. 154(b) by 177 days.

This patent is subject to a terminal disclaimer.

(21) Appl. No.: 16/600,856

(22) Filed: Oct. 14, 2019

(65) Prior Publication Data

US 2020/0322150 A1 Oct. 8, 2020

Related U.S. Application Data

(60) Provisional application No. 62/829,541, filed on Apr. 4, 2019.

(51) Int. Cl.
*H04L 9/32* (2006.01)
*H04L 12/751* (2013.01)
*H04L 45/02* (2022.01)

(52) U.S. Cl.
CPC .......... *H04L 9/3213* (2013.01); *H04L 9/3215* (2013.01); *H04L 9/3234* (2013.01); *H04L 45/026* (2013.01)

(58) Field of Classification Search
CPC ... H04L 9/3215; H04L 9/3247; H04L 45/026; H04L 63/0807; H04L 63/0876;
(Continued)

(56) References Cited

U.S. PATENT DOCUMENTS

| 7,920,558 B2* | 4/2011 | He | H04L 45/52 |
| | | | 370/389 |
| 9,762,583 B2* | 9/2017 | Guccione | H04L 63/101 |

(Continued)

FOREIGN PATENT DOCUMENTS

WO WO 2008030629 A1 3/2008

OTHER PUBLICATIONS

International Search Report and Written Opinion for International Application No. PCT/US2020/02649, dated Jul. 21, 2020.
(Continued)

*Primary Examiner* — Mohammad A Siddiqi
(74) *Attorney, Agent, or Firm* — Baker Botts, LLP

(57) ABSTRACT

In one embodiment, a method includes receiving an ISIS hello message including an attestation token from a second network apparatus, determining that the attestation token is valid for the second network apparatus at a current time, establishing an adjacency to the second network apparatus in response to the determination, computing, based at least on the attestation token, a trust level for a first link from the first network apparatus to the second network apparatus and a trust level for first prefixes associated with the first link, and sending an LSP comprising the trust level for the first link and the trust level for the first prefixes to neighboring network apparatuses, where the trust level for the first link and the trust level for the prefixes are used by the network apparatuses in the network to compute a routing table of the network.

20 Claims, 6 Drawing Sheets

(58) Field of Classification Search
CPC ..... H04L 45/02; H04L 9/3213; H04L 9/0897; H04L 9/3234; H04L 63/0853
See application file for complete search history.

(56) References Cited

U.S. PATENT DOCUMENTS

| | | | | |
|---|---|---|---|---|
| 2007/0180495 | A1* | 8/2007 | Hardjono | H04W 12/122 726/3 |
| 2020/0153627 | A1* | 5/2020 | Wentz | G06F 21/6209 |
| 2020/0160320 | A1* | 5/2020 | Williams | G06Q 20/36 |
| 2020/0322312 | A1* | 10/2020 | Psenak | G06F 21/57 |

OTHER PUBLICATIONS

Li, et al., Enhancing the Trust of Internet Routing with Lightweight Route Attestation, IEEE Transactions on Information Forensics and Security, vol. 7, No. 2, XP011433682, pp. 691-703, Apr. 1, 2012.

* cited by examiner

| TLV-Type | To be allocated by IANA |
|---|---|
| Length | Variable |
| Value | Structured information including the attestation parameters and token |

*FIG. 3A*

| TLV-Type | To be allocated by IANA |
|---|---|
| Length | Variable |
| Value | Security Level (1 byte) |

*FIG. 3B*

| TLV-Type | To be allocated by IANA |
|---|---|
| Length | Variable |
| Value | Structured information about attestation procedures supported by the node |

*FIG. 3C*

APPLYING ATTESTATION TOKENS TO THE INTERMEDIATE SYSTEM TO INTERMEDIATE SYSTEM (ISIS) ROUTING PROTOCOL

PRIORITY

This application claims the benefit, under 35 U.S.C. § 119(e), of U.S. Provisional Patent Application No. 62/829,541, filed 4 Apr. 2019, which is incorporated herein by reference.

TECHNICAL FIELD

The present disclosure relates generally to a field of data communications, and more particularly, to validating routers in a network by utilizing attestation tokens in Intermediate System to Intermediate System (ISIS) routing protocol.

BACKGROUND

Dedicated crypto-processors, such as a Trusted Platform Module (TPM), may take measurements necessary to attest the identity of a device and running binaries on the device. These measurements may comprise evidence that the device is in a known safe state. However, a receiver must be able to certify the evidence as fresh. Without a guarantee of freshness, an attacker may have an opening to inject previously recorded measurements, asserting what is replayed as being current. When sensitive information is being transmitted to a destination device through a network, network traffic should not be sent through comprised network nodes (e.g., hacked or captured nodes) to prevent leakage of or tampering with the sensitive information. However, traditional protections and link encryption are ineffectual to ensure that each router in the end to end path is not compromised especially when an attacker gains root access to a device via some exploit.

BRIEF DESCRIPTION OF THE DRAWINGS

FIG. 3A illustrates an example format for Attestation TLV.

FIG. 3B illustrates an example format for Security-Level Sub-TLV.

FIG. 3C illustrates an example format for Attestation-Capability Sub-TLV.

DESCRIPTION OF EXAMPLE EMBODIMENTS

Overview

Figure 1:
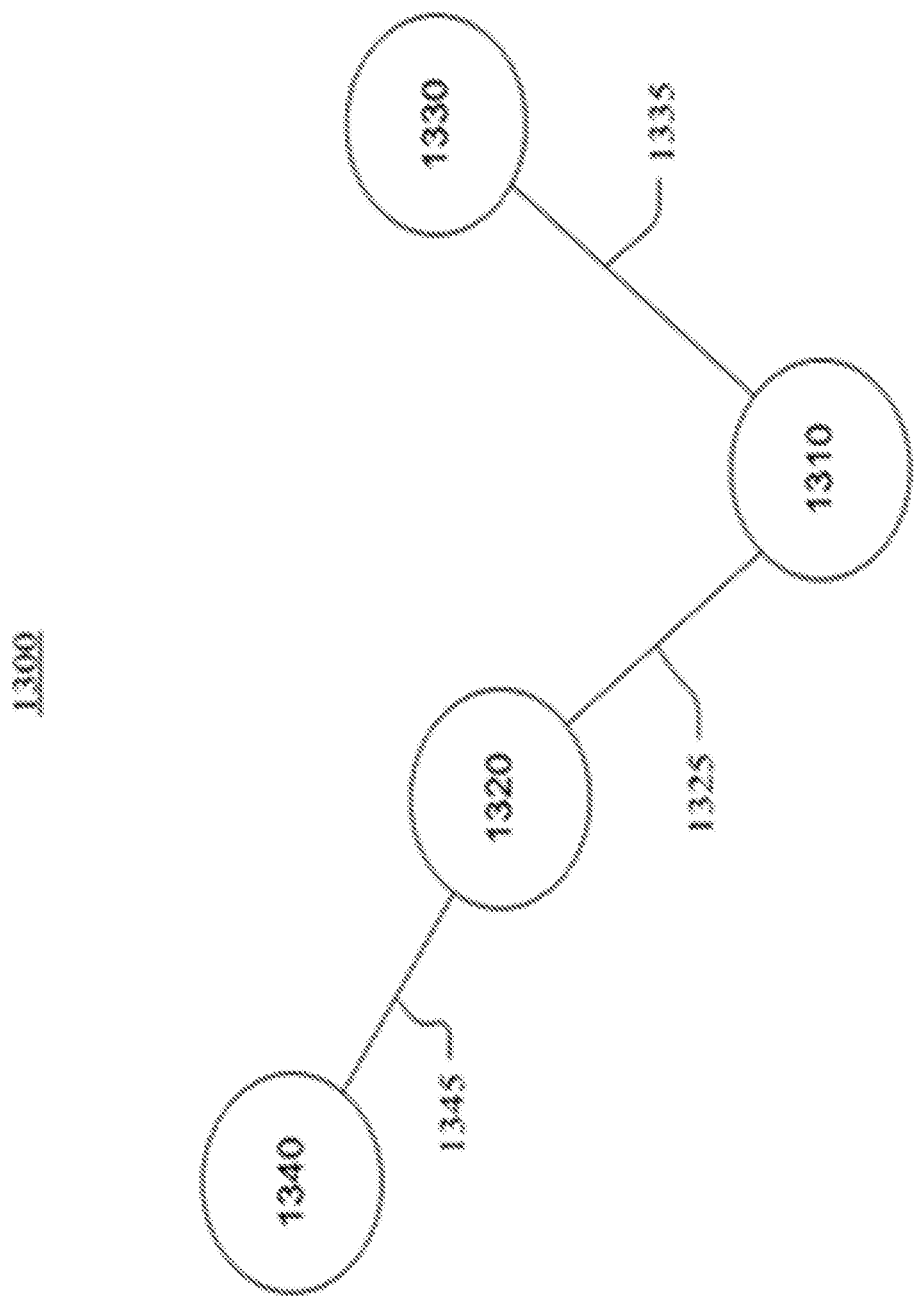
FIG. 1 illustrates a schematic representation of the network supporting a trusted ISIS routing protocol.

In particular embodiments, a first network node may be configured to operate an ISIS routing protocol in a network. The first network node may receive an ISIS hello message comprising an attestation token from a second network node. The attestation token may be for proving that the second network node is in a known safe state. The first network node may determine that the attestation token is valid for the second network node at a current time. The first network node may establish an adjacency to the second network node in response to the determination. The first network node may compute a trust level for a first link from the first network node to the second network node and a trust level for first prefixes associated with the first link based at least on the attestation token. The first network node may send an LSP comprising the trust level for the first link and the trust level for the first prefixes to neighboring network nodes. The LSP may be flooded to one or more of network nodes in the network. The trust level for the first link and the trust level for the prefixes may be used by the network nodes in the network to compute a routing table of the network.

Example Embodiments

Verifiable evidence of device tampering may be appended to interactions based on existing communication protocols. This may give evidence receivers the option of evaluating trustworthiness of the network device and reacting accordingly. For example, the evidence receiver may determine that it no longer trusts the network device and adjusts network policy to mitigate possible damage or potential security threats. Dedicated crypto-processors such as TPM may take necessary measurements to attest the identity of a device and its running binaries. These measurements may include detecting evidence which indicates that the device is in a known safe state. However, a receiver may need to certify the evidence as fresh because, without a guarantee of freshness, an attacker may inject previously recorded measurements to make the receiver to assert what is replayed as being current.

Traditional systems and methods may identify or detect the replaying of old evidence via a nonce. For example, a nonce could be a random number provided by the entity making the request. This nonce may be passed into the TPM which may generate results including a signature based on the nonce which could not have been generated without providing that nonce. However, the nonce-based method may reply on the transactional challenge/response interaction model. In other words, the nonce-based method may not work with unidirectional communications originating from the attesting device. For example, a nonce may not work with an asynchronous push, multicast, broadcast messages, etc.

Particular embodiments of this disclosure may perform a unidirectional attestation which is applicable to, for example, an asynchronous push, multicast, broadcast messages, etc., for the authentication of the corresponding devices in conjunction with corresponding binaries. Particular embodiments may enable a communication platform to assess whether the peer platforms are trustworthy. For example, the system may perform a detection of invalid attestations that can trigger alarms/events reduction of network access from a suspect device or can become a part of Admission Control (e.g., IEEE 802.1X). The communication platforms may be capable of supporting the unidirectional attestation mechanism. As an alternative approach for attesting freshness, particular embodiments of the system may generate a token which may allow external entities to validate freshness of asserted data based on the state of internal counters within the TPM. The token may allow the replay attacks to be detected without a nonce and make it possible for the attestation for asynchronous push, multicast, broadcast, etc. The token or signed measurement may be referred to as a canary stamp or Stamp since token or signed measurement may provide authenticity like a stamp and may be used as an indicator of an early sign of trouble. Particular embodiments of the system may combine the token or signed measurement with TPM-integrated capabilities aimed at verifying that valid binary processes are running. The TMP-integrated capabilities may include, for example, but are not limited to, trusted execution environments (TEE) which may provide runtime malware protections and authenticated code modules (ACM) which may ensure that only digitally signed code modules can be loaded into a CPU. Particular embodiments of this disclosure may be implemented within a communication platform (e.g., a proprietary platform) or/and across multiple communication platforms (e.g., proprietary platforms and third-party platforms).

Particular embodiments of the system provide an advantageous technical solution for communication platforms to attest authenticity and allow a common unidirectional attestation framework to be applied across existing networking hardware as well as virtual routers. Particular embodiments of this disclosure may be applicable to, for example, but not limited to, Cisco Secure Boot, Linux Integrity Measurement Architecture (IMA), Intel's Trusted Execution Technology (TXT), etc., and may enable these platforms to validate that a processor is running known software with valid chain of binary signatures. Particular embodiments of the system may provide defining requirements for placing different types of signed measurements (e.g., token or stamps) while allowing receivers to evaluate potential trustworthiness of attested information. Particular embodiments of the system may support controller-based evaluation of signed measurements (e.g., token or stamps) which includes subscription-based mechanisms to incrementally push information/evidence to be verified and/or beachhead use cases and platforms.

TPM functionality may be embedded in a wide variety of devices including mobile phones, PCs, routers, etc. While traditional TPM methods may enable a device to prove freshness in a replay to a response, these methods may not support unidirectional attestation. Particular embodiments of this disclosure may provide mechanisms for verifiable unidirectional attestation by creating and distributing a token. This token may link counters on an attesting device with one or more globally verifiable characteristics or parameters (e.g., a counter on a controller, a RADIUS server, or a time authority). Upon its creation, the token may be distributed freely to any number of receivers/verifiers. Upon receiving the token, a receiver may accept subsequently attested information (e.g., stamps) from a remote TPM and attest asynchronous push, multicast, or broadcast communications of a device. It is notable that, in this disclosure, the term "TPM" may be used as an umbrella term for the necessary functionality. The mechanisms described may be supported by one or more proprietary hardware and other hardware supporting the TPMv2 specification.

In particular embodiments, the system may create the initial token by extracting current counters from an attestee's TPM, and hashing it with information from an external TPM. As a result, the system may generate a non-spoofable token which binds continuously incrementing counters on an attestee with some known external state. In particular embodiments, any resetting of the TPM counters may be visible in any subsequent TPM queries. Any restarting of the platform may be exposed in subsequent TPM queries. Within these bounds of reset and restart, the TPM's counter time-tick may keep continuous increments. Therefore, the push of attestee TPM information which includes these three counters may be known to have occurred subsequently to any previously received measurement. On the other hand, if the reset and restart counters have not changed, the incremental time since any previous measurement may also be known. In particular embodiments, the system may validate device information asserted from outside the TPM's program configuration registers (PCR). The majority of information needing to be trusted by network peers may not be contained within the TPM's PCR. Particular embodiments of the system may provide indirect methods of validating that a device has not been compromised based on the data or processes of exiting systems or platforms.

Particular embodiments of the system may provide integration solutions with both integrity verification (IV) solution and, where applicable, integrity measurement architecture (IMA). The system may provide combination solutions that enable validating that acceptable binaries are currently loaded on a peer communication system or platform. Particular embodiments of the system may allow the receiver to receive stamps and verify the information without supplementary evidence being sent with the stamp. For non-controller-based implementations, the system may not require that the verification steps occur on the receiver.

A network may only be as secure as its weakest links. Information sent from a first device to a second device on the network may pass through multiple intermediary nodes or devices (e.g., routers, network controllers, etc.) before it reaches the target device. It is vitally important that the information, especially when it includes sensitive material, should not be sent through compromised network nodes (e.g., hacked or captured nodes) to prevent leakage of or tampering with the sensitive information. However, as network size and complexity increase, the potential number of attack vectors for an attacker to exploit also grows. It may be difficult to determine with certainty whether each individual node through which an arbitrary piece of information may pass is secured without having a dramatic effect on the performance of the network. Moreover, if an attacker gains root access to a device (e.g., via some previously undetected exploit), traditional protections and link (e.g., in-transit) encryption may prove ineffectual at protecting any sensitive information.

Particular embodiments may apply attestation in the context of security management at a network-level to determine in real-time whether a node in a network should be trusted. This disclosure introduces an asynchronous, unidirectional time-based variant of attestation that may allow other nodes in a network to reliably ascertain if a source that is routing information has been compromised. The token used in this variant of attestation may be referred to as a "canary stamp" as it positively marks data as it transitions through the network and can indicate on a front-line basis whether any security problems may exist within the network or within a given node.

In particular embodiments, the attestation token may be employed within the ISIS routing protocol. The ISIS routing protocol is a routing protocol designed to transmit data through a computer network efficiently by determining the optimal route for the data through packet-switched network. The ISIS routing protocol is a link-state Interior Gateway Protocol (IGP). Link-state protocols are characterized by the propagation of the information required to build a complete network connectivity map, or "network topology," on each participating node. The network topology may then be used to calculate the shortest path to destinations. Attestation tokens (e.g., canary stamps) may be used in the ISIS routing protocol to augment the capabilities of the standard protocol allowing the network to build a "trusted network topology" that comprises known secured nodes.

In the ISIS routing protocol, a routing domain may be divided into one or more subdomains. Each subdomain may be referred to as an area and assigned an area address. Routing within an area may be referred to as Level-1 routing. Routing between Level-1 areas may be referred to as Level-2 routing. In Open Systems Interconnection (OSI) terminology, a device in a network (e.g., a router or other network node) is referred to as an Intermediate System (IS). An IS may operate at Level 1, Level 2, or both. ISs that operate at Level 1 may exchange routing information with other Level-1 ISs in the same area. ISs that operate at Level 2 may exchange routing information with other Level-2 devices regardless of whether they are in the same Level-1 area. The set of Level-2 devices and the links that interconnect them form the Level-2 subdomain, which may not be partitioned for routing to work properly in the ISIS routing protocol.

Nodes in an ISIS network exchange routing information with peer nodes (e.g., ISs operating at the same level) using protocol data units (PDUs). The ISIS routing protocol uses type-length value (TLV) parameters to carry information in LSPs. LSPs may be used in the ISIS routing protocol network to advertise a network node's neighboring nodes and other destinations connected to the node. In particular embodiments, a network node may advertise up to 256 LSPs as an LSP set. The LSP set may be derived from a link state database stored in the network node. The network node may also receive LSPs from its neighbors, which may be installed in the locally stored link state database and may be propagated out to its neighboring nodes. In this way, the network nodes (e.g., routers) in an ISIS routing protocol topology may maintain a mirrored link-state database. Nodes that operate in both level-1 and level-2 routing may maintain a separate database for each level.

TLVs may be incorporated in a variable-length portion of the header of a PDU (including an LSP). In particular, a TLV may comprise a one-byte Type code and a one-byte Length code. In many cases, the Type code for each type of TLV may be assigned by the Internet Assigned Numbers Authority for interoperability. So configured, the Value code may comprise up to 255 bytes. TLVs allow the ISIS routing protocol to be extendable. TLVs may also comprise nested TLVs or sub-TLVs. The TLV may be used to carry a variety of types of information in LSPs. In particular embodiments, a canary stamp may be embodied in the ISIS routing protocol as an attestation-focused TLV.

This disclosure describes novel TLVs for use in an ISIS-compliant network. In particular embodiments, a first novel TLV may be an Attestation TLV. The Attestation TLV may be a top-level ISIS TLV in the hierarchy of TLVs. The length of the TLV may be variable. The value of the TLV may comprise structured information including attestation parameters and an attestation token (e.g., a canary stamp) generated using a trusted platform module of the network node. Another novel TLV may be an Attestation-Capability Sub-TLV. The Attestation-Capability Sub-TLV may a sub-TLV of the ISIS router Capability TLV. The length of the Attestation-Capability Sub-TLV may be variable. The value of the Attestation-Capability Sub-TLV may comprise structured information about the attestation capabilities supported by the node that declares it. Another novel TLV may be a Security-Level Sub-TLV. The Security-Level Sub-TLV may be a Sub-TLV of the Extended/MT IP Reachability TLVs or the Extend/MT IS Reachability TLVs. The length of the Security-Level Sub-TLV may be variable. The value of the Security-Level Sub-TLV may comprise the security level of an indicated network node.

Using the above described TLVs, a network enforcing the ISIS routing protocol may implement canary stamps. The nodes of a network may be further configured with functions that reflect an augmentation and improvement on traditional ISIS routing protocol functions. Many of the functions, as described in this disclosure, may be interrelated and may rely on other nodes in the network supporting the capability as well in order to function successfully. Several of the functions made available by the Attestation TLV and other above-described TLVs are explained below in the context of FIG. 1. FIG. 1. illustrates a schematic representation of the network supporting a trusted ISIS routing protocol.

In particular embodiments, a node 1310 of a network 1300 supporting a trusted ISIS routing protocol may be configured to advertise its attestation capability. Through this function, the network node may be capable of positively announcing to other nodes of the network 1320 and 1330, along links 1325 and 1335 that it is capable of supporting attestation procedures (e.g., canary stamps) in the ISIS routing protocol. In some embodiments the node may further announce particular functions that it supports or variants of attestation capabilities.

In particular embodiments, a network node 1310 may be configured to advertise an Attestation TLV. The network node 1310 may comprise a trusted computing infrastructure (e.g., a trusted platform module or other crypto-processor) and may append information provided by the trusted computing infrastructure to LSPs it sends, e.g., to node 1320 along link 1325 through an Attestation TLV. The Attestation TLV may be appended to one or more, LSPs originating in a device that supports the trusted ISIS routing procedure. In this configuration, the LSPs may be propagated through the network (e.g., sent to one or more Level-1 or Level-2 areas and devices as appropriate). For example, an LSP set from node 1310 to node 1320 along link 1325 may be propagated to node 1340 along link 1345.

In particular embodiments, a network node 1310 may be configured to advertise an Attestation TLV to neighboring nodes in the network, e.g., through ISIS Hello PDUs. For example, the network node 1310 may be configured to send ISIS Hello PDUs to nodes 1320 and 1330 along links 1325 and 1335 respectively. The network node 1310 may be configured to append information provided by its trusted computing architecture to ISIS Hello PDUs issued by the node as, e.g., an Attestation TLV. A so-modified ISIS Hello PDU may allow nodes that receive the ISIS Hello PDU (e.g., nodes 1320 and 1330) to determine the trustworthiness of the message of the ISIS Hello PDU, as well as the trustworthiness of the adjacency implied by the issuance of an ISIS Hello PDU. In particular embodiments, any type of ISIS Hello PDUs may be augmented with the Attestation TLV (e.g., point-to-point, Level-1, Level-2, etc.). Devices in the ISIS routing protocol may be configured to ignore TLVs that they cannot process, so the addition of an Attestation TLV to the ISIS Hello PDU may not impact devices that do not support attestation.

In particular embodiments, a network node 1320 may be configured to validate Attestation TLVs received from ISIS Hello PDUs from other network nodes, such as network node 1310. The network node 1320 may be further configured to act based on the status of the validation according to a specified policy provided to the network node. For example, if the validation fails, the network node 1320 may effectively ignore the ISIS Hello PDU. The network node 1320 may refuse to acknowledge the adjacency match. As another example, if the validation fails, the network node 1320 may be configured to set a specified metric of the connection to a maximum value. As another example, if the validation fails, the network node 1320 may approve the adjacency match.

In particular embodiments, a network node 1320 may be configured to advertise the trustworthiness of a link or adjacency with a neighboring node using a Security-Level Sub-TLV. For example, the network node 1320 may advertise the trustworthiness of the link 1325 or the adjacency of the node 1310. The Security-Level Sub-TLV may comprise information to indicate one or more neighboring nodes and information to indicate a trustworthiness level of that neighboring node. As an example, a network node 1320 may validate an Attestation TLV received with an ISIS Hello PDU from a neighboring node 1310. The Attestation TLV may fail the validation and the network node 1320 may determine to refuse to acknowledge the ISIS Hello PDU, as it has determined that the neighboring node 1310 is not trustworthy (e.g., it may be executing unexpected or unsigned code, or it may otherwise show evidence of tampering). As another example, the network node 1320 may determine a security level based on Attestation TLV received with an ISIS Hello PDU from the neighboring node 1310. The network node 1320 may advertise the determined security level in the Security-Level Sub-TLV when advertising the adjacency within an Extend/MT IS Reachability TLV.

In particular embodiments, a network node 1320 may be configured to advertise the trustworthiness of a prefix using a Security-Level Sub-TLV. A network node 1320 in a trusted network may provide prefixes it has detected to neighboring nodes (e.g., node 1340) across level and areas (e.g., if a level-2 node, it may provide to other level-2 nodes). A PDU sent to identify that prefix may be appended with a Security-Level Sub-TLV to indicate a trustworthiness of the prefix based on the trustworthiness of the network node originating the prefix. In particular embodiments, trustworthiness for local prefixes (e.g., prefixes on a particular network node) advertised in an LSP may be determined based on a local policy (e.g., a policy of the particular network node). In particular embodiments, a network node may leak prefixes between areas or levels. When the network node leaks prefixes between areas or levels, the network node may set the trustworthiness of the prefix based on the trustworthiness of the originating node in the source area or level. In particular embodiments, a network node may redistribute prefixes received from other network nodes. When the network node redistributes prefixes, the network node may set the trustworthiness of the prefix based on the trustworthiness of the originating node.

In particular embodiments, a network node 1320 may be configured to validate an Attestation TLV received in an LSP from another network node 1310. The network node 1320 may use information from a trusted computing infrastructure to ascertain if the information in the LSPs should be treated as trustworthy or untrustworthy. Based on an attestation policy, the network node 1320 may be further configured to accept or discard LSPs from other nodes that fail to advertise valid Attestation TLVs or advertise invalid TLVs. The attestation policy may be locally configured, domain-wide, network wide, or have further scope as appropriate.

Specific techniques may be adopted throughout sections of the network based on how many network nodes support Attestation TLVs. In particular embodiments, if all nodes (e.g., nodes 1310, 1320, 1330, and 1340) in an ISIS routing protocol area support Attestation TLVs and attestation procedures, the LSPs that failed an attestation validation may be excluded from the network. For example, the LSP may be excluded during route calculation.

In particular embodiments, a network node 1320 may track the degrees of trustworthiness of links 1325 in a trusted network topology. The trustworthiness of a link 1325 may be determined based on the trustworthiness of a network node 1310 based on a received Attestation TLV or Security-Level Sub-TLV. The degree of trustworthiness may be incorporated into route calculations. For example, in the event that two or more paths have equal cost (calculated in a standard way), the trustworthiness of the links may be used as a tiebreaker so that the network node may choose the path with the highest degree of trustworthiness. As another example, the trustworthiness may be one of several factors considered when performing the cost calculations (e.g., as a part of a weighted combination). As another example, a network node may prioritize trustworthiness, and use only the degree of trustworthiness of a link or network node as a consideration when determining a route to use.

In particular embodiments, a network node 1320 may compare the degree of trustworthiness of links in a trusted network topology to a threshold degree of trust. During route calculation, the network node 1320 may only consider the links with a degree of trust above the threshold degree of trust. In other words, the network node 1320 may refuse to consider paths that may otherwise lead through suspicious network nodes.

Figure 2:
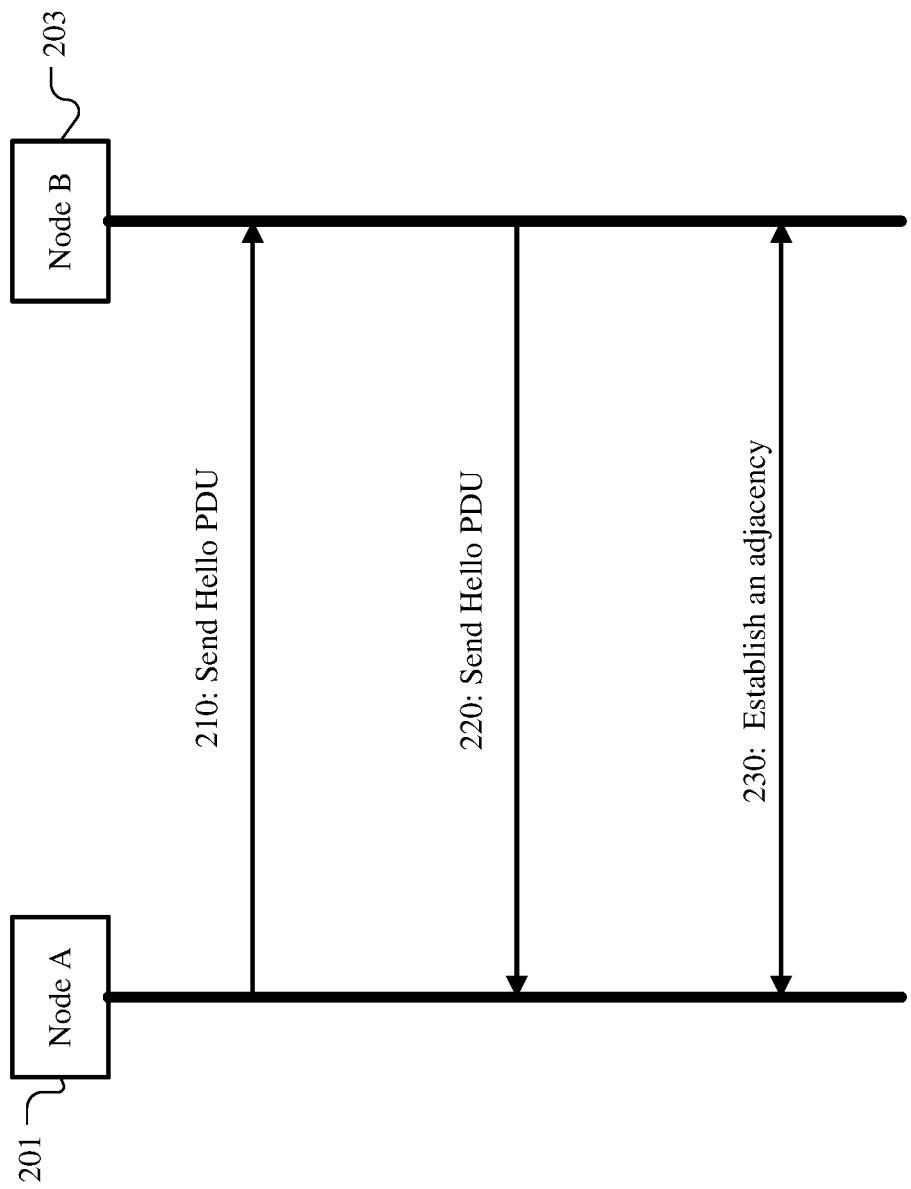
FIG. 2 illustrates example message sequences for establishing an adjacency in ISIS.

FIG. 2 illustrates example message sequences for establishing an adjacency in ISIS. In an example illustrated in FIG. 2, node A 201 and node B 203 are connected via a link. At the beginning, the node A 201 and node B 203 may not be aware of each other. Because both node A 201 and node B 203 are configured to operate the ISIS routing protocol, the nodes 201 and 203 are sending ISIS hello messages at a regular interval. IS-IS hello messages may be used to discover neighbors on a link. Once the neighbors are discovered, the ISIS hello messages may act as keepalive messages to maintain the adjacency. At step 210, node A 201 sends an ISIS hello message over the link connected to node B 203. At step 220, node B 203 sends an ISIS hello message over the link connected to node A 201. Because both node A 201 and node B 203 discover each other, both nodes may establish an adjacency at step 230 and send one or more LSP messages to each other.

In particular embodiments, a first network node 1310 may be configured to operate an ISIS routing protocol in a network 1300. The first network node 1310 may receive an ISIS hello message comprising an attestation token from a second network node 1320. The attestation token may be for proving that the second network node 1320 is in a known safe state. The ISIS hello message may comprise an Attestation TLV carrying the attestation token. FIG. 3A illustrates an example format for Attestation TLV. The Attestation TLV may be a top-level ISIS TLV in the hierarchy of TLVs. The length of the TLV may be variable. The value of the TLV may comprise structured information including attestation parameters and an attestation token (e.g., a canary stamp) generated using a trusted platform module of the network node. Although this disclosure describes receiving an ISIS hello message comprising an attestation token in a particular manner, this disclosure contemplates receiving an ISIS hello message comprising an attestation token in any suitable manner.

In particular embodiments, the first network node 1310 may determine that the attestation token is valid for the second network node 1320 at a current time. To determine that the attestation token is valid for the second network node 1320 at the current time, the first network node 1310 may forward the attestation token and an identity of the second network node 1320 and any attestation parameters needed for a verification to a third-party verifier. The third-party verifier may be determined to be trustworthy in the network 1300. The first network node 1310 may receive a response comprising a confirmation that the attestation token is valid for the second network node 1320 at the current time. Once the first network node 1310 receives the confirmation from the verifier, the first network node 1310 may be able to verify one or more following attestation tokens from the second network node 1320 without communicating with the verifier. Although this disclosure describes determining an attestation token for a network node is valid at a current time in a particular manner, this disclosure contemplates determining an attestation token for a network node is valid at a current time in any suitable manner.

In particular embodiments, the first network node 1310 may establish an adjacency to the second network node 1320 in response to the determination. In particular embodiments, the first network node 1310 may compute a trust level for a first link 1325 from the first network node 1310 to the second network node 1320 based at least on the attestation token. As an example and not by way of limitation, the first network node 1310 may set a maximum value to the trust level for the first link 1325 if the first network node 1310 determines that the attestation token for the second network node 1320 is valid at the current time. As another example and not by way of limitation, the first network node 1310 may set a minimum value to the trust level for the first link 1325 if the first network node 1310 determines that the attestation token for the second network node 1320 is not valid at the current time. As yet another example and not by way of limitation, the first network node 1310 may determine a value of the trust level for the first link 1325 based on the attestation token and any other suitable parameters for the trust level for the first link 1325. Although this disclosure describes computing a trust level for a link in a particular manner, this disclosure contemplates computing a trust level for a link in any suitable manner.

In particular embodiments, the first network node 1310 may compute a trust level for first prefixes associated with the first link 1325 based at least on the attestation token. As an example and not by way of limitation, the first network node 1310 may set a maximum value to the trust level for the first prefixes associated with the first link 1325 if the first network node 1310 determines that the attestation token for the second network node 1320 is valid at the current time. As another example and not by way of limitation, the first network node 1310 may set a minimum value to the trust level for the first prefixes associated with the first link 1325 if the first network node 1310 determines that the attestation token for the second network node 1320 is not valid at the current time. As yet another example and not by way of limitation, the first network node 1310 may determine a value of the trust level for the first prefixes associated with the first link 1325 based on the attestation token and any other suitable parameters for the trust level for the first link 1325. Although this disclosure describes computing a trust level for prefixes associated with a link in a particular manner, this disclosure contemplates computing a trust level for prefixes associated with a link in any suitable manner.

In particular embodiments, the first network node 1310 may send an LSP comprising the trust level for the first link 1325 and the trust level for the first prefixes associated with the first link 1325 to neighboring network nodes. The LSP may comprise an Extend/MT IS Reachability TLV for the first link 1325 that describes a link availability of the first link 1325. The Extend/MT IS Reachability TLV for the first link 1325 may comprise a Security-Level Sub-TLV that carries the trust level for the first link 1325. The LSP may comprise an Extend/MT IP Reachability TLV for the first prefixes associated with the first link 1325 that describes prefixes associated with the first link 1325. The Extend/MT IP Reachability TLV for the first prefixes associated with the first link 1325 may comprise a Security-Level Sub-TLV that carries the trust level for the first prefixes associated with the first link 1325. FIG. 3B illustrates an example format for Security-Level Sub-TLV. The length of the Security-Level Sub-TLV may be variable. The value of the Security-Level Sub-TLV may comprise the security level of an indicated link or prefixes. LSP may be flooded to one or more network nodes in the network. In particular embodiments, a network node may leak prefixes between areas or levels. When the network node leaks prefixes between areas or levels, the network node may set the trustworthiness of the prefix based on the trustworthiness of the originating node in the source area or level. In particular embodiments, a network node may redistribute prefixes received from other network nodes. When the network node redistributes prefixes, the network node may set the trustworthiness of the prefix based on the trustworthiness of the originating node. The network nodes in the network may use the trust level for the first link and the trust level for the prefixes to compute a routing table of the network. Although this disclosure describes advertising a security level for a link and a security level for prefixes associated with the link in a particular manner, this disclosure contemplates advertising a security level for a link and a security level for prefixes associated with the link in any suitable manner.

In particular embodiments, the first network node 1310 may receive an ISIS message comprising an attestation capability information associated with the third network node 1330. from a third network node 1330. The ISIS message may comprise an ISIS Router Capability TLV that may comprise information regarding capabilities of the originating network node of the ISIS message. The ISIS Router Capability TLV may comprise an Attestation-Capability Sub-TLV. FIG. 3C illustrates an example format for Attestation-Capability Sub-TLV. The length of the Attestation-Capability Sub-TLV may be variable. The value of the Attestation-Capability Sub-TLV may comprise structured information about the attestation capabilities supported by the originating network node of the ISIS message. The first network node 1310 may determine whether the attestation capability information associated with the third network node 1330 satisfies a pre-determined attestation capability requirement based on the attestation capability information. In particular embodiments, the first network node 1310 may process the ISIS message based on a local policy if the attestation capability associated with the third network node 1330 satisfies the pre-determined attestation capability requirement. In particular embodiments, the attestation capability associated with the third network node 1330 may not satisfy the pre-determined attestation capability requirement. In such a case, the first network node 1310 may process the ISIS message based on a local policy. As an example and not by way of limitation, the first network node 1310 may drop any ISIS messages from a network node whose attestation capability does not satisfy the pre-determined attestation capability requirement. As another example and not by way of limitation, the first network node 1310 may receive an ISIS message comprising an ISIS Router Capability TLV. However, the ISIS Router Capability TLV does not comprise an Attestation-Capability Sub-TLV. The first network node 1310 may, based on a local policy, drop any ISIS messages from the originating network node because the originating network node does not support Attestation. Although this disclosure describes processing attestation capability information associated with a network node in a particular manner, this disclosure contemplates processing attestation capability information associated with a network node in any suitable manner.

In particular embodiments, the first network node 1310 may receive a second ISIS hello message comprising a second attestation token from a third network node 1330. The second attestation token may be for proving that the third network node 1330 is in a known safe state. The first network node 1310 may determine that the second attestation token fails to be valid for the third network node 1330 at a current time. The first network node 1310 may process the second ISIS hello message based on a local policy if the second attestation token is determined to fail to be valid for the third network node 1330 at the current time. Although this disclosure describes receiving an attestation token that is not valid for the originating network node at the current time in a particular manner, this disclosure contemplates receiving an attestation token that is not valid for the originating network node at the current time in any suitable manner.

In particular embodiments, the first network node 1310 may drop the second ISIS hello message based on the local policy if the first network node 1310 determines that the second attestation token fails to be valid for the third network node 1330 at the current time. In particular embodiments, the local policy may instruct to exclude a network node that fails to provide a valid attestation token from the network 1300. In such cases, the first network node 1310 may drop ISIS messages from a network node that fails to provide a valid attestation token at the current time. Although this disclosure describes dropping an ISIS message from a network node based on a local policy if the network node fails to provide a valid attestation token in a particular manner, this disclosure contemplates dropping an ISIS message from a network node based on a local policy if the network node fails to provide a valid attestation token in any suitable manner.

In particular embodiments, the first network node 1310 may set a metric of a second link 1335 from the first network node 1310 to the third network node 1330 to a pre-determined value associated with a failed attestation based on the local policy if the second attestation token fails to be valid for the third network node 1330 at the current time. In particular embodiments, the local policy may instruct to set the metric of a link toward a network node that fails to provide a valid attestation token to a particular value. For example, the first network node 1310 may set the metric of the second link 1335 to a possible maximum value because the first network node 1310 determines that the attestation token from the third network node 1330 is not valid at the current time. Thus, the second link 1335 from the first network node 1310 to the third network node 1330 may be used only when no other path is available for routing a flow except a path including the second link 1335. In particular embodiments, the first network node 1310 may set the metric of the second link 1335 to any other suitable value based on the local policy. Although this disclosure describes setting a metric of a link to a pre-determined value based on a local policy in a particular manner, this disclosure contemplates setting a metric of a link to a pre-determined value based on a local policy in any suitable manner.

In particular embodiments, the first network node 1310 may process the second ISIS hello message regardless whether the second attestation token is valid for the third network node 1330 at the current time or not based on the local policy. In particular embodiments, the local policy may instruct to process ISIS messages regardless of the attestation token. In particular embodiments, the local policy may instruct to process a particular type of ISIS messages regardless of the attestation token. In particular embodiments, the local policy regarding the attestation token may not exist. The first network node 1310 may process the second ISIS hello message as if the second attestation token is valid for the third network node 1330 at the current time. Although this disclosure describes processing ISIS messages regardless of the attestation token in a particular manner, this disclosure contemplates processing ISIS messages regardless of the attestation token in any suitable manner.

In particular embodiments, the first network node 1310 may generate a third attestation token using one or more crypto-processors associated with the first network node 1310. The third attestation token may be valid for a pre-determined amount of time. As the network nodes in the network 1300 are configured to provide a valid attestation token in every ISIS message, the first network node 1310 may generate an attestation token using the one or more crypto-processors associated with the first network node 1310. The first network node 1310 may re-generate an attestation token when a previous attestation token expires. Although this disclosure describes generating an attestation token in a particular manner, this disclosure contemplates generating an attestation token in any suitable manner.

In particular embodiments, the first network node 1310 may add the third attestation token to every ISIS hello message the first network node 1310 sends until a new attestation token is generated after the pre-determined amount of time is elapsed. In particular embodiments, the first network node 1310 may add the third attestation token to every LSP message the first network node 1310 sends until a new attestation token is generated after the pre-determined amount of time is elapsed. In particular embodiments, the first network node 1310 may be configured to include an attestation token to every ISIS message the first network node 1310 originates. The first network node 1310 may include the generated attestation token in every ISIS hello message and every ISIS LSP message the first network node 1310 originates. The network nodes in the network 1300 may determine whether the attestation token in the ISIS message the first network node originates is valid. The network nodes in the network 1300 may process the ISIS message based on the local policy effective at the network nodes. Although this disclosure describes adding an attestation token to every ISIS message the network node originates in a particular manner, this disclosure contemplates adding an attestation token to every ISIS message the network node originates in any suitable manner.

Figure 4:
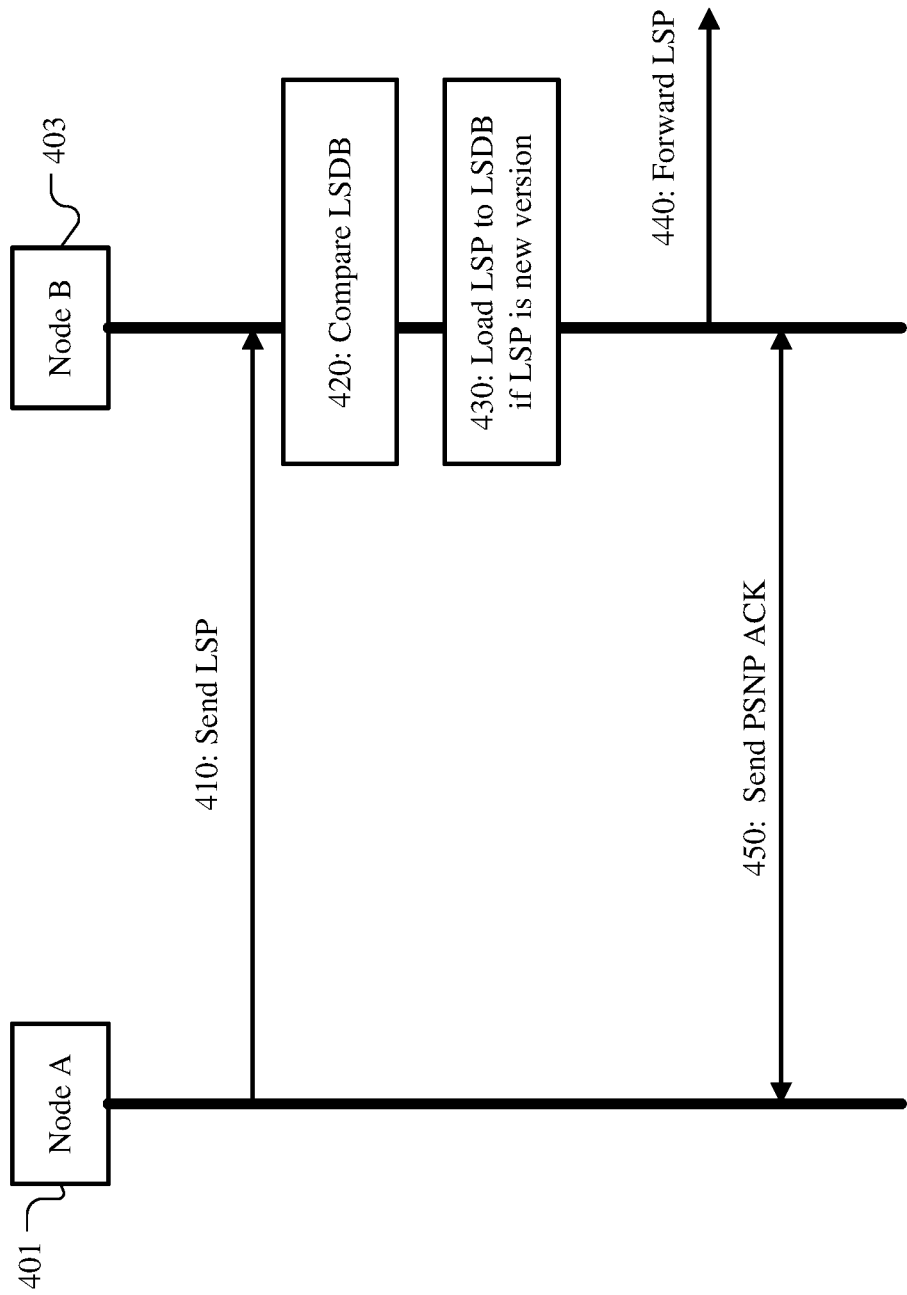
FIG. 4 illustrates example message sequences for flooding a Link State PDU (LSP).

FIG. 4 illustrates example message sequences for flooding a Link State PDU (LSP). At step 410, node A 401 may send an LSP comprising information associated with links connected to the node A 401. At step 420, node B 403 may compare the received LSP with an LSP Database (LSDB) maintained by the node B 403. At step 430, node B 403 may load the LSP to LSDB if the received LSP is a new version. At step 440, node B 403 may forward the received LSP to other connected network nodes. At step 450 node B 403 may send a Partial Sequence Numbers PDU (PSNP) Acknowledgement to node A 401. With this, the LSP messages may be flooded to all the network nodes within a defined layer of the network.

In particular embodiments, the first network node 1310 may receive an LSP originated from a fourth network node 1340. The LSP may comprise a fourth attestation token that is for proving that the fourth network node 1340 is in a known safe state. The first network node 1310 may determine that the fourth attestation token fails to be valid for the fourth network node 1340 at a current time. The first network node 1310 may process the LSP based on a local policy. As an example and not by way of limitation, the first network node 1310 may drop the LSP from the fourth network node 1340 based on the local policy if the first network node 1310 determines that the fourth attestation token fails to be valid for the fourth network node 1340 at the current time. The first network node 1310 may drop any ISIS message from the fourth network node 1340. As another example and not by way of limitation, the first network node 1310 may set a metric of each link in the LSP from the fourth network node 1340 to a pre-determined value associated with a failed attestation based on the local policy if the first network node 1310 determines that the fourth attestation token fails to be valid for the fourth network node 1340 at the current time. When the first network node 1310 computes a routing path for a flow, the links connected to the fourth network node 1340 may be used only when no other paths are available. As yet another example and not by way of limitation, the first network node 1310 may process the LSP originated from the fourth network node 1340 regardless whether the fourth attestation token is valid for the fourth network node 1340 at the current time based on the local policy. Although this disclosure describes processing an LSP from a network node that fails to provide a valid attestation token at the current time in a particular manner, this disclosure contemplates processing an LSP from a network node that fails to provide a valid attestation token at the current time in any suitable manner.

In particular embodiments, the first network node 1310 may receive an LSP originated from a fourth network node 1340 comprising a trust level for a third link associated with the fourth network node 1340 and a trust level for a third prefixes associated with the third link. The first network node 1310 may compute a routing table of the network based on the received LSP originated from the fourth network node 1340. The routing table may comprise information regarding the trust level for the third link and the trust level for the third prefixes. Although this disclosure describes generating a routing table comprising a trust level for a link and a trust level for prefixes associated with a link in a particular manner, this disclosure contemplates generating a routing table comprising a trust level for a link and a trust level for prefixes associated with a link in any suitable manner.

In particular embodiments, the first network node 1310 may route a flow over the third link only when the trust level for the third link satisfies the required trust level for the flow. As an example and not by way of limitation, the first network node 1310 may need to compute a routing path for a flow that is not associated with any security requirements. The first network node 1310 may compute the routing path for the flow without considering trust levels associated with the links in the path. As another example and not by way of limitation, the first network node 1310 may need to compute a routing path for a flow that requires a particular minimum security-level for the links the flow passes through. When the first network node 1310 computes a routing path for the flow, the first network node 1310 may filter links that are associated with security levels lower than the required minimum security level. Thus, the selected routing path may comprise links associated with security levels greater than or equals to the required minimum security level. Although this disclosure describes computing a routing path considering security levels associated with the links in a particular manner, this disclosure contemplates computing a routing path considering security levels associated with the links in any suitable manner.

In particular embodiments, the first network node 1310 may determine that a plurality of routing paths is available for a flow. The cost for each of the plurality of routing paths is identical to each other. The first network node 1310 may compute a trust score of each of the plurality of paths for the flow. The trust score may be a lowest trust level associated with links within the path. The first network node 1310 may select a path associated with a highest trust score among the plurality of paths as a routing path for the flow. The first network node 1310 may route the flow over the selected path. Although this disclosure describes selecting a routing path based on a lowest trust level associated with links in the path in a particular manner, this disclosure contemplates selecting a routing path based on a lowest trust level associated with links in the path in any suitable manner.

Figure 5:
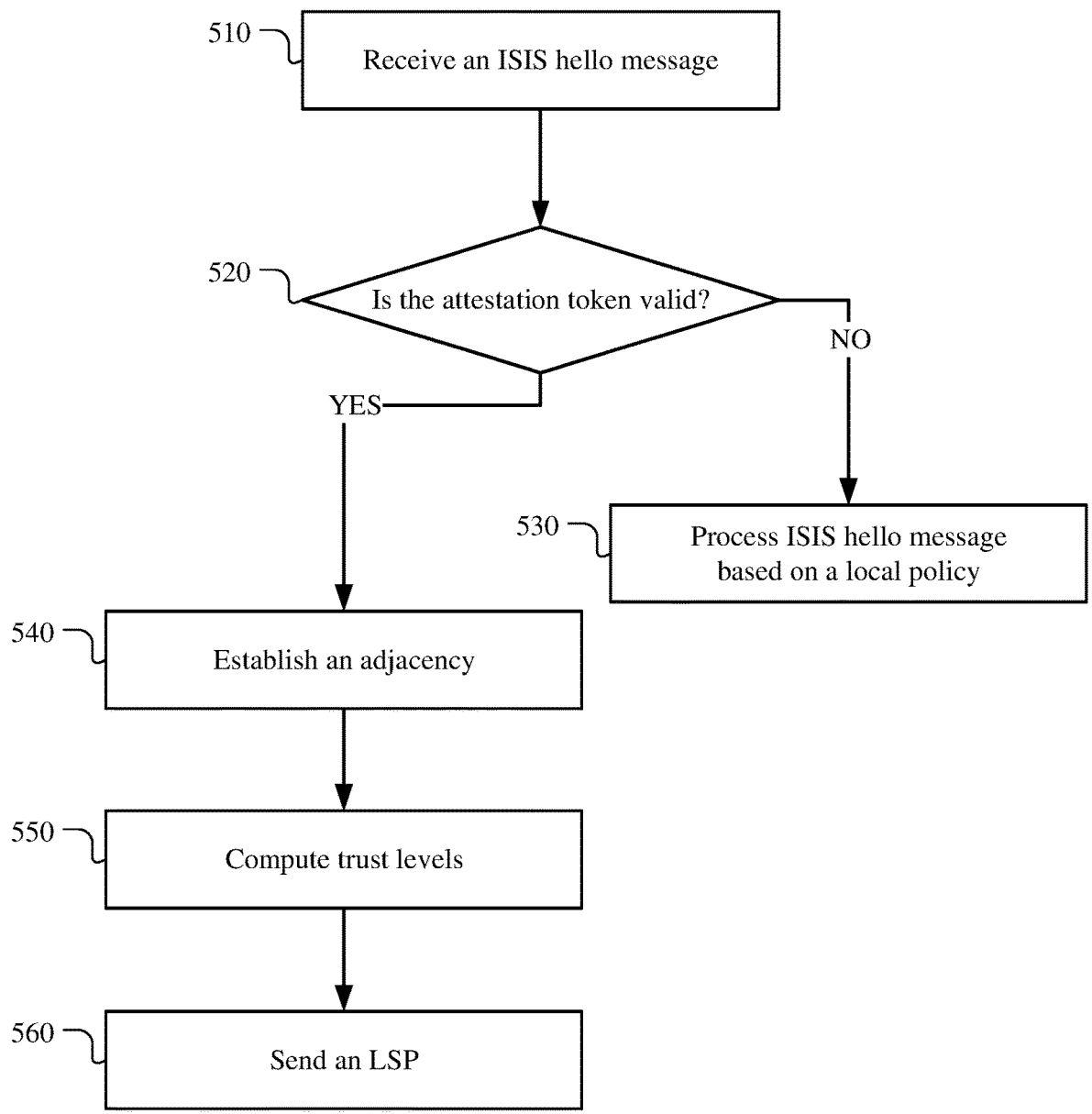
FIG. 5 illustrates an example method for validating a network node with an attestation token in a network supporting a trusted ISIS routing protocol.

FIG. 5 illustrates an example method 500 for validating a network node with an attestation token in a network supporting a trusted ISIS routing protocol. The method may begin at step 510, where a first network node may receive an ISIS hello message comprising an attestation token from a second network node. The attestation token may be for proving that the second network node is in a known safe state. At step 520, the first network node may determine that the attestation token is valid for the second network node at a current time. At step 530, the first network node may process the ISIS hello message based on a local policy if the first network node determines that the attestation token is not valid for the second network node at the current time. At step 540, the first network node may establish an adjacency to the second network node if the first network node determines that the attestation token is valid for the second network node at the current time. At step 550, the first network node may compute a trust level for a first link from the first network node to the second network node and a trust level for first prefixes associated with the first link based at least on the attestation token. At step 560, the first network node may send an LSP comprising the trust level for the first link and the trust level for the first prefixes to neighboring network nodes. The LSP may be flooded to one or more network nodes in the network. The trust level for the first link and the trust level for the prefixes may be used by the network nodes in the network to compute a routing table of the network. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for validating a network node with an attestation token in a network supporting a trusted ISIS routing protocol including the particular steps of the method of FIG. 5, this disclosure contemplates any suitable method for validating a network node with an attestation token in a network supporting a trusted ISIS routing protocol including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Systems and Methods

Figure 6:
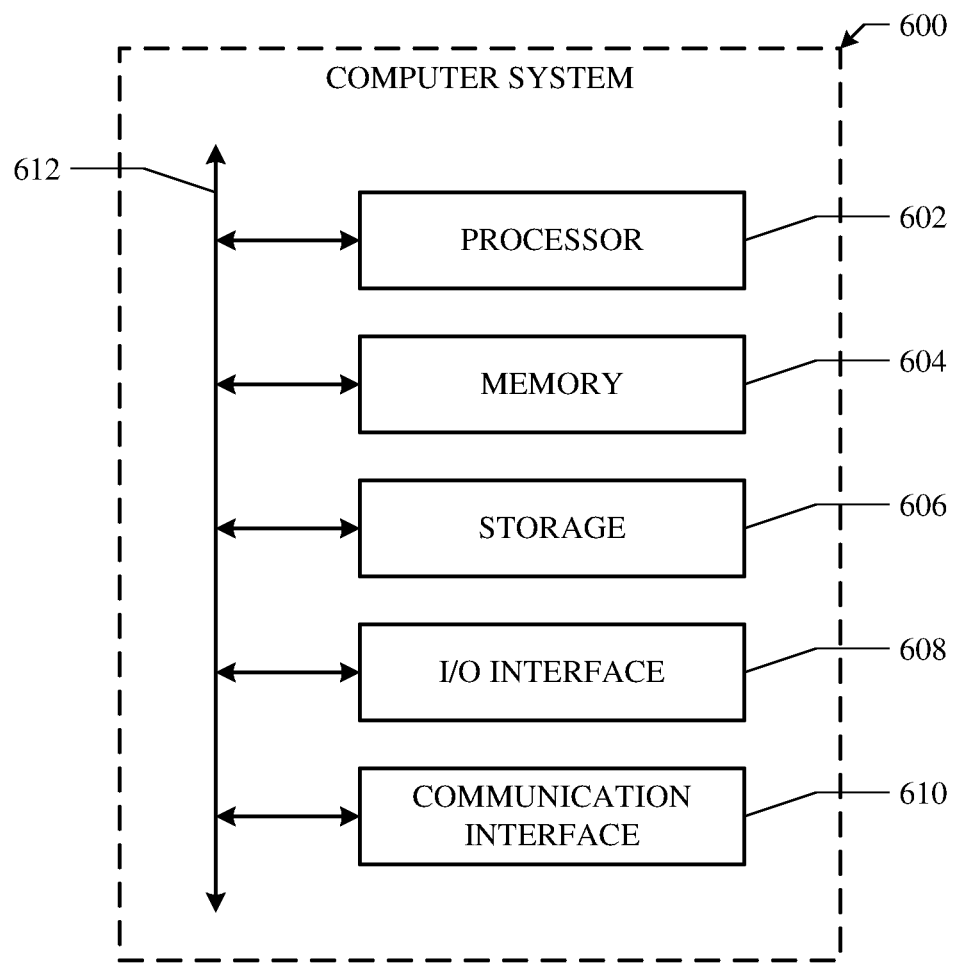
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method by a first network apparatus configured to operate an Intermediate System to Intermediate System (ISIS) routing protocol in a network, comprising:
   receiving, from a second network apparatus, an ISIS hello message comprising an attestation token, wherein the attestation token is for proving that the second network apparatus is in a known safe state;
   determining that the attestation token is valid for the second network apparatus at a current time;
   establishing, in response to the determination, an adjacency to the second network apparatus;
   computing, based at least on the attestation token, a trust level for a first link from the first network apparatus to the second network apparatus and a trust level for first prefixes associated with the first link; and
   sending, to neighboring network apparatuses, a Link State PDU (LSP) comprising the trust level for the first link and the trust level for the first prefixes, wherein the LSP is flooded to one or more network apparatuses in the network, and wherein the trust level for the first link and the trust level for the prefixes are used by the network apparatuses in the network to compute a routing table of the network.

2. The method of claim 1, further comprising:
   receiving, from a third network apparatus, an ISIS message comprising an attestation capability information associated with the third network apparatus;
   determining, based on the attestation capability information, whether the attestation capability information associated with the third network apparatus satisfies a pre-determined attestation capability requirement; and
   dropping, if the attestation capability information associated with the third network apparatus does not satisfy the pre-determined attestation capability requirement, any ISIS message originated from the third network apparatus.

3. The method of claim 1, wherein determining that the attestation token is valid for the second network apparatus at the current time comprises:
   forwarding the attestation token and an identity of the second network apparatus to a third-party verifier, wherein the third-party verifier is determined to be trustworthy in the network; and
   receiving a response comprising a confirmation that the attestation token is valid for the second network apparatus at a current time.

4. The method of claim 1, further comprising:
   receiving, from a third network apparatus, a second ISIS hello message comprising a second attestation token, wherein the second attestation token is for proving that the third network apparatus is in a known safe state;
   determining that the second attestation token fails to be valid for the third network apparatus at a current time; and
   processing the second ISIS hello message based on a local policy.

5. The method of claim 4, wherein the local policy instructs to drop the second ISIS hello message if the second attestation token fails to be valid for the third network apparatus at the current time.

6. The method of claim 4, wherein the local policy instructs to set a metric of a second link from the first network apparatus to the third network apparatus to a pre-determined value associated with a failed attestation if the second attestation token fails to be valid for the third network apparatus at the current time.

7. The method of claim 4, wherein the local policy instructs to process the second ISIS hello message regardless of whether the second attestation token is valid for the third network apparatus at the current time.

8. The method of claim 1, further comprising:
   generating a third attestation token using one or more crypto-processors associated with the first network apparatus, wherein the third attestation token is valid for a pre-determined amount of time.

9. The method of claim 8, further comprising:
   adding the third attestation token to every ISIS hello message the first network apparatus sends until a new attestation token is generated after the pre-determined amount of time is elapsed.

10. The method of claim 8, further comprising:
    adding the third attestation token to every LSP message the first network apparatus sends until a new attestation token is generated after the pre-determined amount of time is elapsed.

11. The method of claim 1, further comprising:
    receiving an LSP originated from a fourth network apparatus, wherein the LSP comprises a fourth attestation token that is for proving that the fourth network apparatus is in a known safe state;
    determining that the fourth attestation token fails to be valid for the fourth network apparatus at a current time; and
    processing the LSP based on a local policy.

12. The method of claim 1, further comprising:
    receiving an LSP originated from a fourth network apparatus, wherein the LSP comprises a trust level for a third link associated with the fourth network apparatus and a trust level for a third prefixes associated with the third link; and
    computing, based at least on the LSP from the fourth network apparatus, a routing table of the network, wherein the routing table comprises information regarding the trust level for the third link and the trust level for the third prefixes.

13. The method of claim 12, wherein the first network apparatus routes a flow over the third link only when the trust level for the third link satisfies the required trust level for the flow.

14. The method of claim 12, further comprising:
    determining that a plurality of routing paths is available for a flow, wherein each of the plurality of routing paths is associated with an identical cost;
    computing, for each of the plurality of paths for the flow, a trust score of the path, wherein the trust score is a minimum trust level associated with links within the path; and
    selecting a path associated with a highest trust score among the plurality of paths to route the flow.

15. One or more computer-readable non-transitory storage media embodying software that is operable on a first network apparatus that is configured to operate an ISIS routing protocol in a network when executed to:

receive, from a second network apparatus, an ISIS hello message comprising an attestation token, wherein the attestation token is for proving that the second network apparatus is in a known safe state;
determine that the attestation token is valid for the second network apparatus at a current time;
establish, in response to the determination, an adjacency to the second network apparatus;
compute, based at least on the attestation token, a trust level for a first link from the first network apparatus to the second network apparatus and a trust level for first prefixes associated with the first link; and
send, to neighboring network apparatuses, a Link State PDU (LSP) comprising the trust level for the first link and the trust level for the first prefixes, wherein the LSP is flooded to one or more network apparatuses in the network, and wherein the trust level for the first link and the trust level for the prefixes are used by the network apparatuses in the network to compute a routing table of the network.

16. The media of claim 15, wherein the software is further operable when executed to:
receive, from a third network apparatus, an ISIS message comprising an attestation capability information associated with the third network apparatus;
determine, based on the attestation capability information, whether the attestation capability information associated with the third network apparatus satisfies a pre-determined attestation capability requirement; and
drop, if the attestation capability information associated with the third network apparatus does not satisfy the pre-determined attestation capability requirement, any ISIS message originated from the third network apparatus.

17. The media of claim 15, wherein determining that the attestation token is valid for the second network apparatus at the current time comprises:
forwarding the attestation token and an identity of the second network apparatus to a third-party verifier, wherein the third-party verifier is determined to be trustworthy in the network; and
receiving a response comprising a confirmation that the attestation token is valid for the second network apparatus at a current time.

18. The media of claim 15, wherein the software is further operable when executed to:
receiving, from a third network apparatus, a second ISIS hello message comprising a second attestation token, wherein the second attestation token is for proving that the third network apparatus is in a known safe state;
determining that the second attestation token fails to be valid for the third network apparatus at a current time; and
processing the second ISIS hello message based on a local policy.

19. The media of claim 18, wherein the local policy instructs to drop the second ISIS hello message if the second attestation token fails to be valid for the third network apparatus at the current time.

20. A first network apparatus that is configured to operate an ISIS routing protocol in a network comprising:
one or more processors; and
one or more computer-readable non-transitory storage media coupled to one or more of the processors and comprising instructions operable when executed by one or more of the processors to cause the system to:
receive, from a second network apparatus, an ISIS hello message comprising an attestation token, wherein the attestation token is for proving that the second network apparatus is in a known safe state;
determine that the attestation token is valid for the second network apparatus at a current time;
establish, in response to the determination, an adjacency to the second network apparatus;
compute, based at least on the attestation token, a trust level for a first link from the first network apparatus to the second network apparatus and a trust level for first prefixes associated with the first link; and
send, to neighboring network apparatuses, a Link State PDU (LSP) comprising the trust level for the first link and the trust level for the first prefixes, wherein the LSP is flooded to one or more network apparatuses in the network, and wherein the trust level for the first link and the trust level for the prefixes are used by the network apparatuses in the network to compute a routing table of the network.

* * * * *